3,558,199
WORK SPINDLE FOR TOOLS
Ernst Raiser, Rommelsbach, and Walter Christner, Hulben, Germany, assignors to Burkhardt & Weber K.G., Reutlingen, Germany, a firm
Filed Sept. 5, 1968, Ser. No. 757,618
Claims priority, application Germany, Sept. 8, 1967, 1,602,718
Int. Cl. F11c 35/06
U.S. Cl. 308—207                             2 Claims

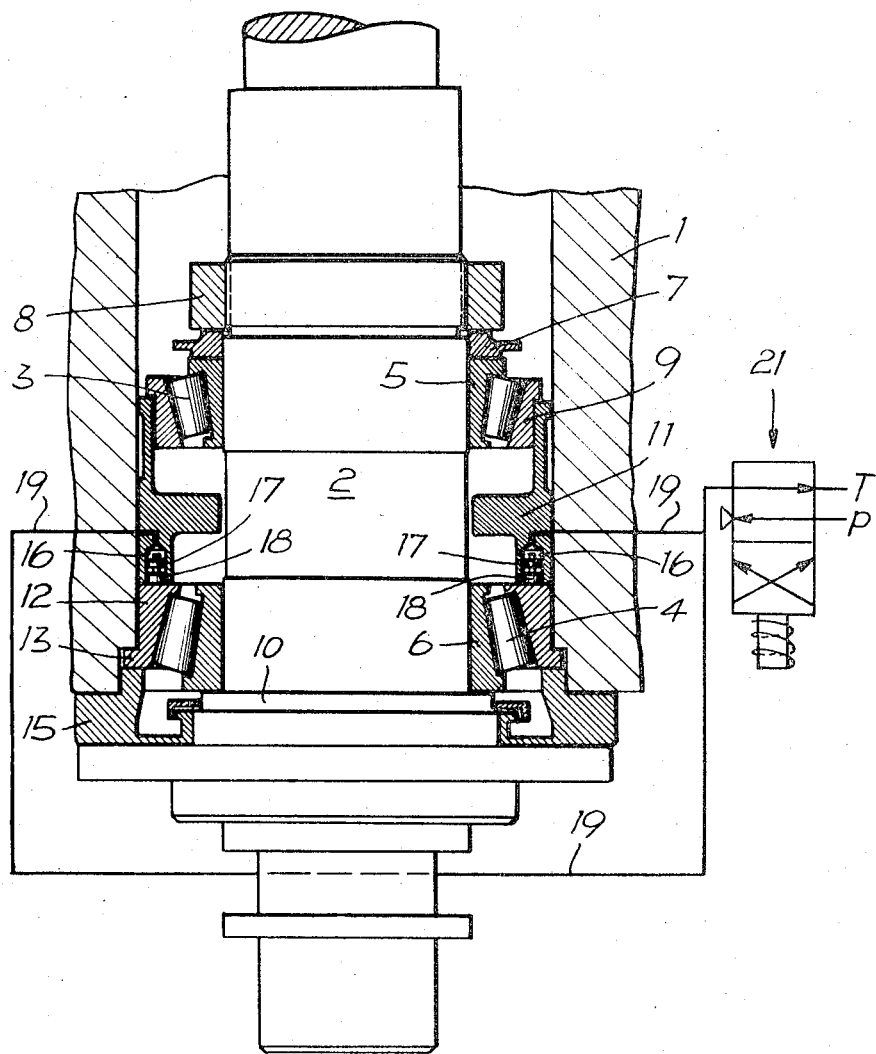

ABSTRACT OF THE DISCLOSURE

A very simple device for varying the bearing clearance of a tapered-roller bearing of a work spindle so as to be the most suitable for different speeds of the spindle consisting of a plurality of small cylinders containing pistons which act in the axial direction upon one of the races of the bearing by means of a pressure medium, the pressure of which may be varied.

---

The present invention relates to a work spindle for tools which is rotatably mounted in the spindle housing on tapered-roller bearings at least one of which has a race which may be shifted in the axial direction of the spindle by means of an adusting device so as to vary the bearing clearance of this bearing.

Prior to this invention, the work spindles of this type were provided with a slidable bearing race which was mechanically adjustable in the axial direction by means of a threaded ring. Such an adjustment for varying the bearing clearance was, however, relatively complicated which had the disadvantage that, if the work spindle was to be driven at different speeds, it was practically impossible to adjust the bearing clearance so as to be the most suitable for the particular speed, even though it was known that the bearing clearance should be larger than at low speeds.

It is an object of the present invention to mount a work spindle so as to permit the bearing clearance to be easily adjusted at any time so as to be the most suitable for the particular speed at which the work spindle is to be driven.

For attaining this object the present invention provides an adjusting device which consists of at least one cylinder and a piston slidable therein for shifting the slidable bearing race of the work spindle in the axial direction, and of suitable control means for applying different pressures upon this piston. The device according to the invention may be of a very simple construction and it permits the bearing clearance of the work spindle to be adjusted in an extremely simple manner so as to be the most suitable for each of the different speeds at which the work spindle is to be driven. This may be accomplished, for example, in a machine which is provided with adjusting means for driving the work spindle at different speeds by connecting these adjusting means to a device according to the invention for adjusting the pressure which acts upon the pistons so as to shift the bearing race of the work spindle. Consequently, any adjustment of the speed adjusting means of the machine to drive the work spindle at a different speed automatically results in an adjustment of the device according to the invention so that the bearing clearance will be the most suitable for that particular speed.

In many cases it will, however, be sufficient to provide only two different bearing clearances for two different speed ranges of the work spindle, namely a maximum clearance for the high-speed range and a minimum clearance for the low-speed range. The adjusting device according to the invention may in this case consist of a simple valve which may be changed from one position to another so as to connect the pressure chambers of the cylinders containing the pistons either to a source of a pressure medium or to a container to which this medium is returned under atmospheric pressure.

The features and advantages of the present invention will become more clearly apparent from the following detailed description thereof which is to be read with reference to the accompanying drawing which shows an axial section of the bearing structure according to the invention.

As illustrated in the drawing, a main spindle 2 of a machine, not shown, for example, for driving different tools, is rotatably mounted in a spindle housing 1 by means of two tapered-roller bearings 3 and 4. The outer end surface of the inner race 5 of bearing 3 facing one end of spindle 2 engages upon a spacing ring 7 which, in turn, engages upon a threaded ring 8 which is screwed upon an external thread on spindle 2, while the opposite outer end surface of the inner race 6 of bearing 4 facing the other end of spindle 2 engages upon a flange 10 on the spindle. The outer race 9 of bearing 3 is supported on a ring 11 which is slidable in the axial direction in the housing 1 and the other end surface of which engages upon the outer race 12 of bearing 4. This outer race 12 is provided with an external flange 13 which engages into an annular recess in the inner wall of housing 1 and is clamped in a fixed position therein by means of a ring 15.

For shifting the outer race 9 of bearing 3 in its axial direction, the end surface of ring 11 facing the outer race 12 of bearing 4 is provided with a plurality of bores 16 which are equally spaced in the peripheral direction from each other. Each of these bores 16 forms a cylinder in which a piston 17 is slidable the piston rod of which has a pistonlike enlargement 18 wich engages upon the race 12 which is clamped to the housing 1. The inner ends of cylinders 16 which form the pressure chambers thereof may be connected by conduits 19 and an electromagnetically actuated valve 21 either to a container T or to a source of pressure medium P.

When the electromagnetic valve 21 is in the position as illustrated in the drawing, the pressure chambers of cylinders 16 are connected with the container T and are therefore relieved of pressure so that the two tapered-roller bearings 3 and 4 have the largest bearing clearance which has been set by the threaded ring 8. This position is provided for high speeds of the spindle 2. If, however, the spindle should be driven at a low speed, the electromagnetic valve 21 is to be switched over to its other position so that conduit 19 will then be connected with the pressure source P and this pressure will be exerted in the pressure chambers of cylinders 16 upon the pistons 17, whereby ring 11 and thus also the outer race 9 of bearing 3 will be forced in the upward direction, as seen in the drawing. By means of bearing 3, the entire spindle will thus be slightly lifted so that the bearing clearance of the two bearings 3 and 4 will be reduced to a minimum.

While in the drawing the most simple embodiment of the invention is illustrated so as to explain its principle, it may, of course, be modified considerably. Thus, for example, instead of providing an electromagnetic valve 21 which only permits two different pressures to be applied, namely the atmospheric pressure and the pressure which is produced by the source P, it is also possible to provide an adjustable pressure control valve or the like by means of which different pressures varying in steps may be supplied to the pressure chambers of the cylinders 16 so that the tapered-roller bearings 3 and 4 may be adjusted to a larger number of different speeds of spindle 2.

If the spindle 2 is one of a machine tool which is provided with adjusting means for driving this spindle at different speeds, the present invention may be applied in such a manner that these adjusting means of the machine may be connected to or combined with a device, for example, a valve, which permits the pressure acting upon the pistons 17 in the cylinders 16 to be varied so as to be the most suitable for the particular speed as adjusted. Thus, when the respective machine is adjusted so that its spindle will run at a certain speed, the bearing clearance will also be automatically adjusted at the same time so as to be the most suitable for this speed.

Although our invention has been illustrated and described with reference to the preferred embodiment thereof, we wish to have it understood that it is in no way limited to the details of such embodiment but is capable of numerous modifications within the scope of the appended claims.

Having thus fully disclosed our invention, what we claim is:

1. In a bearing structure having a work spindle for tools, said spindle having a longitudinal axis and being adapted to be driven at different speeds, said structure comprising at least two tapered roller bearings on which said spindle is rotatably mounted in a spindle housing, each one of said tapered roller bearings having an inner race and an outer race, said inner race being adapted to rotate with said work spindle and said outer race remaining stationary with respect to the rotation of said spindle, and wherein at least two of said races being shiftable in the direction of said longitudinal axis, at least one of said shiftable races being an outer race, adjusting means for adjusting of said shiftable races in said axial direction so as to vary the bearing clearance, said adjusting means comprise at least one cylinder and a piston slidable therein and adapted to act in the axial direction upon said shiftable outer race, and control means for applying a pressure medium with different pressures upon said piston so as to shift said shiftable outer race and thereby to vary the bearing clearance so as to be the most suitable for the particular speed of said spindle, said adjusting means further comprising a threaded ring adapted to act upon the other shiftable race for mechanically shifting the same in the axial direction.

2. A bearing structure as defined in claim 1, in which said adjusting means comprise a plurality of said cylinders and pistons which are peripherally equally spaced from each other so as to act in the axial direction upon different points of said slidable outer race.

References Cited

UNITED STATES PATENTS

| | | | |
|---|---|---|---|
| 1,982,265 | 10/1934 | Nenninger | 308—207.1 |
| 3,020,109 | 2/1962 | Sloane et al. | 308—207 |
| 3,313,581 | 4/1967 | Kusakobe | 308—189 |

FRED C. MATTERN, JR., Primary Examiner